Patented Nov. 4, 1952

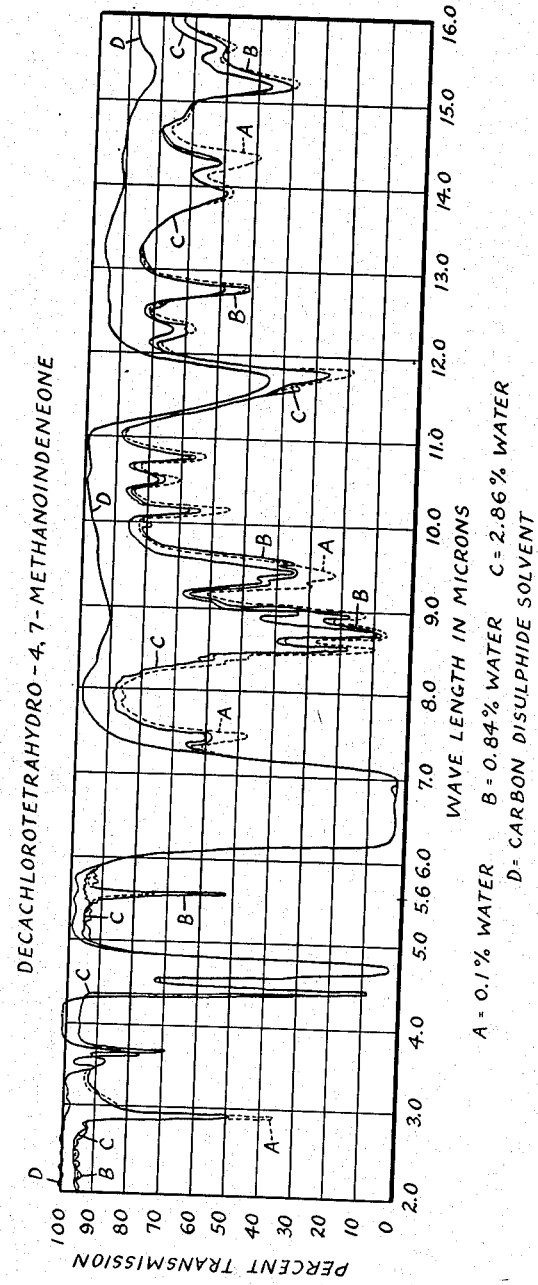

2,616,825

UNITED STATES PATENT OFFICE 2,616,825

DECACHLOROTETRAHYDRO-4,7- METHANO-INDENEONE PESTICIDE AND METHOD FOR COMBATING NOXIOUS ORGANISMS THEREWITH

Everett E. Gilbert, Flushing, and Silvio L. Giolito, New York, N. Y., assignors to Allied Chemical & Dye Corporation, New York, N. Y., a corporation of New York Application November 17, 1950, Serial No. 196,121

11 Claims. (Cl. 167—30)

This invention relates to a new pesticidal composition comprising decachlorotetrahydro-4,7-methanoindeneone and to a method for combating noxious organisms therewith.

The decachlorotetrahydro-4,7-methanoindeneone compositions of our invention are useful in combating a wide variety of noxious organisms including insects and their larvae of the Hymenoptera (flies), Lepidoptera (moths), Coleoptera (beetles) and Orthoptera (grasshoppers) species, and also in combating crop-attacking fungi.

The compositions of our invention comprise essentially a decachlorotetrahydro-4,7-methanoindeneone, usually in hydrate form, which may be applied alone or in association with a spray or dust carrier material in any suitable manner adapted to combat the particular organism to be controlled. As a spray or impregnant, the solid decachlorotetrahydro-4,7-methanoindeneone may conveniently be dissolved or dispersed in any standard liquid carrier, such as kerosene or the like. As a dust, it may be mixed with a suitable finely divided solid material, such as clay or the like. It may readily be applied from solution in solvents in which it is soluble as more fully set forth hereinafter, for example in acetone, lower aliphatic alcohols, or in mixtures of such alcohols with water or kerosene. Application of decachlorotetrahydro-4,7-methanoindeneone in liquid solution form is especially adayted to moth-proofing of fabrics and to control of houseflies and the like, while application in the form of dusts or liquid sprays may conveniently be used in its application to vegetable crops and the like, to control infestations of insects or fungi, whereas grain or flour infesting organisms may be controlled by the addition of small quantities of undiluted decachlorotetrahydro-4,7methanoindeneone directly to the grain material.

The decachlorotetrahydro-4,7-methanoindeneone hydrate is characterized by the following chemical analysis:

|  | Percent Theory ($C_{10}Cl_{10}O$) | Percent Found |
|---|---|---|
| Cl | | |
| C | 72.3 | 72.7 |
| H | 24.4 | 23.8 |
| $H_2O$ | 0 | 0.6 |
| Mol Wt | 0 | 0.1 |
|  | 491 | 296 |

The decachlorotetrahydro-4,7-methanoindeneone is a white crystalline solid with no appreciable odor. Upon heating in a glass melting point tube by conventional procedures up to 300° C., no tendency to melt is noted. It sublimes when heated in the atmosphere; for example, slight sublimation occurs upon oven drying at 110°–115° C., while upon heating at 140° C. at 1–1.5 mm. of Hg pressure, 10–15% of its weight sublimes in three hours. It sublimes with some decomposition when heated in the open atmosphere to 300° C. It is readily soluble in acetone, lower aliphatic alcohols, ethers and the like, and also in nitrobenzene, and sulfuryl chloride. It is somewhat less soluble in benzene, toluene, hexane and petroleum ether, but is sufficiently soluble in warm hexane to allow the use of this material as a recrystallizing solvent if desired. It is virtually insoluble in cold water and only slightly soluble (less than 0.4%) in boiling water. It tends to gel upon separation by cooling, from hot solutions in hydrocarbon solvents. A satisfactory recrystallizing solvent is 85%–90% aqueous ethanol from which gelatin does not occur. It usually exists as a crystalline hydrate when exposed to atmospheric conditions and is useful for insecticidal, etc., purposes in hydrate form.

The decachlorotetrahydro-4,7-methanoindeneone compound is soluble in, and relatively stable toward, strong caustic solutions, such as sodium, potassium and calcium hydroxides. This stability towards caustic materials is of advantage in its application as a pesticide in combination with lime and other alkaline agricultural chemicals, and in this respect it is superior to benzene hexachloride (BHC) and dichlorodiphenyltrichloroethane (DDT) which decompose readily on contact with alkalis. Furthermore, being volatile under normally atmospheric conditions only at temperatures considerably above those usually encountered in use, it has a high residual insecticidal activity and because of its limited solubility in hydrocarbon solvents, it is considerably more resistant in dry cleaning than DDT, which is designated above in the use of this compound as a moth-proofing agent.

In the accompanying figure, the several lines represent the infared spectrogram of the decachlorotetrahydro-4,7-methanoindeneone, which is the essential toxic ingredient of the new pesticidal composition of our invention. The spectrograms were obtained in carbon disulfide solutions of samples of different degrees hydration; dotted line A being the record of substantially anhydrous material (0.10% or 0.03 mol H₂O); solid line B being the record of a slightly hydrated sample (0.84% or 0.24 mol H₂O); while solid line C is the record of an essentially monohydrated sample (2.86% or 0.8 mol H₂O). The three spectrograms are considered substantially identical. Solid line D is the spectrogram of the CS₂ solvent.

These infrared spectrograms were prepared on a standard infrared recording spectrophotometer designed for measuring and recording the infrared transmission of solids, liquids and gases, comprising a double infrared beam which scans the spectrum through the wave length range 2.0 to 16 microns, one part of the beam passing through the sample under study, the other passing through a compensating cell. If the sample under study absorbs radiation, the two beams become unequal. The magnitude of this inequality is a measure of the transmission of the sample of the particular wave length, and the record of these differences within the range of wave lengths scanned is the infrared spectrogram, recorded as an ink drawn line on a chart graduated in percent transmission as ordinates and in wave length as abscissae.

Solid samples, such as the compound of our invention and the related compounds described, are conveniently measured in solution. The spectrograms shown in the figures were all measured by dissolving 0.5 gram of the solid in carbon disulfide and diluting to 10 ml. with the solvent. A small amount of the solution was then introduced into a liquid cell with sodium chloride windows and sealed. The cell was placed in the spectrophotometer in the path of one of the beams as described above.

The infrared spectrogram of any chemical compound serves as an accurate means for identifying the compound. It has been compared with a human fingerprint in its ability to identify a compound with certainty. The characteristic reproducibility of the infrared spectrogram of a given compound is due to the facts that when a molecule is excited by infrared radiation it absorbs energy to a greater degree at some wave length than at others, and that the amount of absorption depends on the configuration and upon the linkages of the atoms composing the molecule. Accordingly, the compound is identified and characterized with certainty by its infrared spectrogram.

The new pesticidal composition of our invention may be prepared by any suitable process, for example by condensing two molecules of hexachlorocyclopentadiene with the aid of sulfur trioxide to form a hexachlorocyclopentadiene reaction product and hydrolyzing the reaction product to the ketone as described in copending application Serial No. 196,123 filed November 17, 1950; or by reacting hexachlorocyclopentadiene with a halosulfonic acid, such as chlorosulfonic acid and fluosulfonic acid, and hydrolyzing the resulting reaction product to form the ketone.

The exact mechanism of the reactions involved in the preparation of the decachlorotetrahydro-4,7-methanoindeneone product is not clearly understood, but the overall reaction is indicated in the equation set forth below:

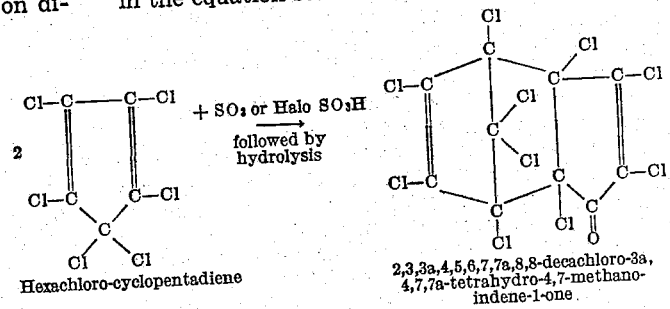

While the overall reaction in the methods of preparation described above proceeds from the same starting material to the same end product when carried out using the SO₃ treatment and when using the halosulfonic acid treatment, the reaction mechanisms probably differ and are believed to proceed somewhat as illustrated below:

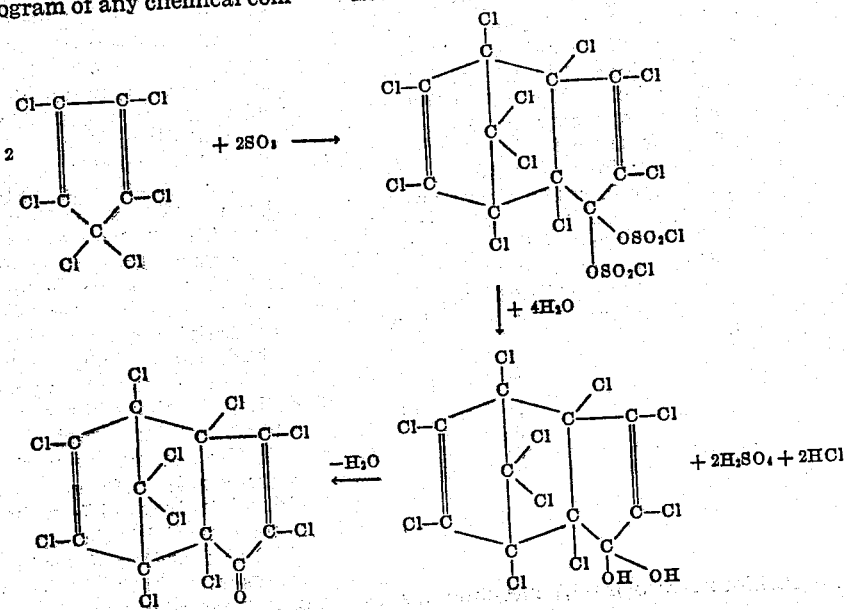

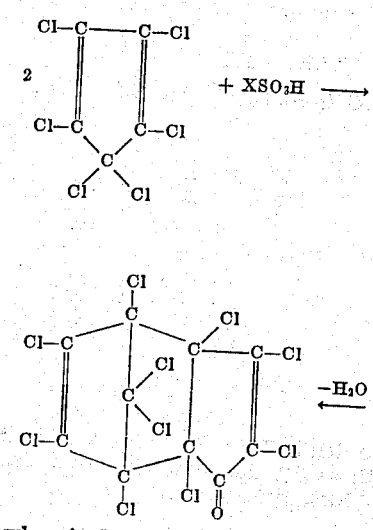
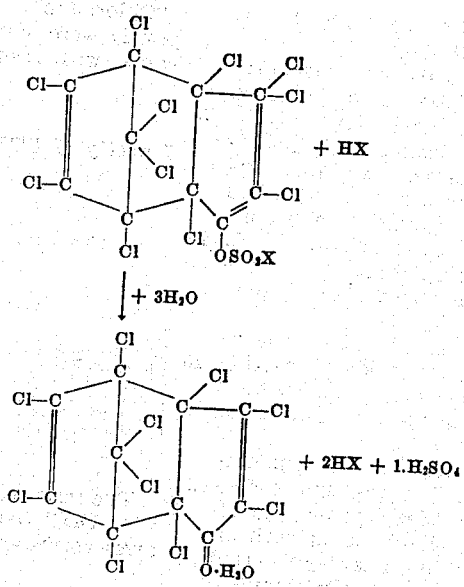

wherein X=chlorine or fluorine

In carrying out the process for preparing the decachlorotetrahydro - 4,7 - methanoindeneone compound above described, according to the procedure wherein sulfur trioxide is used, hexachlorocyclopentadiene and sulfur trioxide are mixed by charging them, either simultaneously or separately, to a reaction vessel. After mixing the reactants, the charge may be digested for a short period, sufficient to condense two molecules of hexachlorocyclopentadiene and to form a liquid reaction product of hexachlorocyclopentadiene and sulfur trioxide.

The liquid $SO_3$-hexachlorocyclopentadiene reaction product thus formed is then hydrolyzed to the decachloromethanoindeneone, by drowning the reaction product in a relatively large volume of an aqueous drowning medium, preferably an alkaline aqueous medium, for example in at least about 5 volumes of drowning medium per volume of reaction product.

After addition of the reaction product to the drowning medium is complete, the mixture may be digested for a short additional period, for example a half hour to insure completion of the hydrolysis.

The product may be filtered at this stage, if desired, but to improve coagulation and ease of filtration, we prefer to agitate the batch for a short period at a temperature somewhat higher than the drowning temperature, for example at about 90°–95° C. for about a half hour, during which the crystalline product may partially or completely redissolve.

When the drowning has been effected in an alkaline solution, the charge is then neutralized, for example with sulfuric acid, whereupon the crystalline product reprecipitates. The amount of acid added for neutralization should be sufficient to bring the mixture preferably to neutrality, or to a very slight alkalinity not exceeding about 0.05% NaOH, as indicated by a pH of 7–8.

After neutralization, the charge is agitated, preferably at a temperature between about 90° C. and about 95° C., for about a half hour while maintaining the mixture at the neutral point or slightly on the alkaline side.

The mixture is then cooled, for example to room temperature to insure relatively complete precipitation of the product, leaving in solution the salts formed in the neutralization step, e. g. alkali metal or ammonium chloride and sulfate.

Separation of the precipitated product may be effected in any desired manner, for example by filtration, centrifugation, etc. and the recovered product may be dried and ground for storage or use. The final product is obtained in hydrate form as a white or light gray solid. The decachlorotetrahydro-4,7-methanoindeneone of our invention may exist in all degrees of hydration from substantially anhydrous to an undried gelatinous solid ostensibly containing 67.3 mols $H_2O$ per mol anhydrous material. A number of examples—chosen at random—are shown in Table I below:

TABLE I

| Sample No. | Weight Percent $H_2O$ | Mols $H_2O$ per Mol Anhydrous Compound | Comment |
|---|---|---|---|
| | 0 | 0 | Theory for anhydrous compound. |
| | 3.54 | 1 | Theory for monohydrate. |
| | 6.84 | 2 | Theory for dihydrate. |
| 1 | 4.76 | 1.36 | Dried 18 hours at 90° C. |
| 2 | 1.70 | .47 | Dried 72 hours at 90° C. |
| 3 | 10.90 | 3.33 | Dried 72 hours at 27° C. |
| 4 | 3.02 | .85 | |
| 5 | 3.04 | .86 | |
| 6 | 71.2 | 67.3 | |
| 7 | 3.20 | .90 | |
| 8 | .10 | .03 | |
| 9 | 2.7 | .77 | |

In carrying out the process for preparing the decachlorotetrahydromethanoindeneone compound of our invention according to the procedure wherein a halosulfonic acid, such as fluosulfonic acid or chlorosulfonic acid, is used as the condensing agent, hexachlorocyclopentadiene and the halosulfonic acid are mixed in a reaction vessel for a period sufficient to form a solid reaction product of hexachlorocyclopentadiene and halosulfonic acid.

The solid hexachlorocyclopentadiene-halosulfonic acid reaction product thus formed is then hydrolyzed to the decachlorotetrahydromethanoindeneone of our invention in a relatively large volume of an aqueous drowning medium.

The halosulfonic acid used as condensing agent to form the hexachlorocyclopentadiene-halosulfonic acid reaction product may be chlorosulfonic acid or fluosulfonic acid, used either alone, or dissolved in a solvent which is inert to the reaction such as tetrachloroethylene.

The temperature of the initial condensation reaction may be somewhat higher than that used when SO₃ is the condensing agent and may be carried as high as 140° C., if desired, and thus effect a reduction in the time necessary for completion of the reaction over that necessary when lower temperatures are employed. Usually temperatures between about 90° C. and about 120° C. are satisfactory to effect completion of the condensation reaction in from about 5 to about 2 hours, respectively.

The molar ratio of halosulfonic acid to hexachlorocyclopentadiene for good yields of reaction product should be at least about 1:2, and we have found that ratios between about 1.25:2 and about 8:2 are satisfactory.

The hydrolysis of the hexachlorocyclopentadienehalosulfonic acid reaction products to decachlorotetrahydromethanoindeneone may be effected by heating the reaction product with an aqueous caustic alkali solution, a water solution alone being ineffective to accomplish complete hydrolysis, probably because of the low solubilities of these reaction products in water. In the case of the chlorosulfonic acid product, hydrolysis may be carried out in aqueous lower aliphatic alcohol solution which appears to impart sufficient solubility to the reaction product to promote hydrolysis. However, the fluosulfonic acid reaction product requires at least some alkali in the solution for adequate hydrolysis. Temperatures at which the hydrolyses are carried out are not particularly critical, but preferably should be at least about 30° C., and temperatures between about 60° C. and about 90° C., that is, temperatures in the vicinity of the boiling points of the lower aliphatic alcohols are satisfactory.

In general, no digestion step is necessary following the hydrolysis of the hexachlorocyclopentadienehalosulfonic acid reaction products as the decachlorotetrahydromethanoindeneone product precipitates readily from the reaction mixture upon acidification with aqueous mineral acids.

The toxicity characteristics of our new decachlorotetrahydro-4,7-methanoindeneone (designated DTMO in the tables) against various pest organisms are indicated by the following tests, results of which are tabulated below.

Comparative tests were run with DDT and the new compound of our invention (DTMO) on laboratory reared DDT-resistant houseflies, with results as shown in Table II. Tests were run by spraying the flies with a solution of toxicant in spray oil ("Ultrasene" brand deodorized kerosene).

TABLE II

*Toxicity of DTMO to houseflies vs. DDT*

| Treatment | Alive | | Dead | | Percent Dead | |
|---|---|---|---|---|---|---|
| | Males | Females | Males | Females | Males | Females |
| DTMO at 0.25% | 5 | 59 | 56 | 0 | 91.8 | 0.0 |
| DTMO at 0.50% | 0 | 19 | 52 | 53 | 100.0 | 73.6 |
| DDT at 0.25% | 27 | 69 | 18 | 3 | 40.0 | 4.2 |
| DDT at 0.50% | 8 | 39 | 53 | 3 | 86.9 | 7.1 |
| Check (no toxicant) | 20 | 29 | 0 | 0 | 0.0 | 0.0 |

Our new compound was compared with 2,3,4,5,-6,7,8,8-octachlorotetrahydro-4,7-methanoindane ("Chlordane") against flies in tests in which panels were sprayed with solutions of the toxicants, with results shown in Table III.

TABLE III

*Toxicity of DTMO to houseflies vs. "Chlordane"*

| Treatment | Spraying Time of Panels (sec.) | No. Flies | No. knocked down after— | | |
|---|---|---|---|---|---|
| | | | 8 hrs. | 24 hrs. | 32 hrs. |
| DTMO, 5% | 5 | 33 | 5 | 32 | 33 |
| | 10 | 32 | 7 | 31 | 32 |
| Isopropanol, 25% | 15 | 31 | 17 | 31 | |
| Ultrasene, 70% | 5 | 26 | 17 | 23 | 25 |
| Chlordane, 5% | 10 | 35 | 31 | 33 | 34 |
| Isopropanol, 25% | 15 | 33 | 33 | | |
| Ultrasene, 70% | | | | | |
| Check (no toxicant) | | 32 | 0 | 0 | 0 |

The tests recorded in Table IV compare DTMO with DDT (both as 5% dusts) against southern armyworms and Mexican bean beetle larvae.

TABLE IV

*Toxicity of DTMO to armyworms and bean beetles vs. DDT*

| Treatment | Percent Kill Against— | |
|---|---|---|
| | Armyworms | B. B. Larvae |
| DTMO, 3%; Clay, 97% | 100 | 80.0 |
| DDT, 3%; Clay, 97% | 100 | 66.6 |

Results on American cockroaches are shown in Table V below, using two hundred mg. of dust for each test.

TABLE V

*Toxicity of DTMO to cockroaches*

| Treatment | No. Roaches | No. knocked down after— | | | |
|---|---|---|---|---|---|
| | | 6 hrs. | 20 hrs. | 28 hrs. | 48 hrs. |
| DTMO, 5%; Clay, 97% | 10 | 0 | 0 | 5 | 10 |
| Check (no toxicant) | 5 | 0 | 0 | 0 | 0 |

Results on stored grain insects, i. e. bean weevil and confused flour beetle are shown in Table VI.

TABLE VI

*Toxicity of DTMO to grain insects*

| Treatment | Hours | Percent Kill— | |
|---|---|---|---|
| | | Bean Weevil | Confused Flour Beetle |
| DTMO, 1.25% in flour | 24 | 20 | 10 |
| | 48 | 80 | 90 |
| DTMO, 2.50% in flour | 24 | 100 | 100 |
| | 48 | 100 | 100 |
| DTMO, 5.00% in flour | 24 | 100 | 100 |
| | 48 | 100 | 100 |
| Chlordane, 1.25% in flour | 24 | 20 | 0 |
| | 48 | 90 | 90 |
| Chlordane, 2.50% in flour | 24 | 100 | 100 |
| | 48 | 100 | 100 |
| Chlordane, 5.00% in flour | 24 | 100 | 100 |
| | 48 | 100 | 100 |
| Check (no toxicant) | 48 | 0 | 0 |

Carpet beetle larvae are customarily used in evaluating moth-proofing characteristics of woolens since they are larvae of the same general type as those of the clothes moth and they not only are in general significantly more resistant to toxicants than the clothes moth larvae, but are actually responsible for a large proportion of the damage to woolen materials loosely characterized as moth damage. "Moth-proofing" tests using carpet beetle larvae as test organisms were carried out by soaking woolen swatches in 1% acetone solution of our decachlorotetrahydromethanoindeneone and "DDT" for comparison. The swatches were dried, weighed to determine deposit, dry cleaned as indicated to determine the tenacity of its adherence to cloth, and exposed to larvae before and after dry cleaning, with results shown in Table VII.

TABLE VII
*Toxicity of DTMO to carpet beetles vs. DDT*

| Treatment | Percent Deposit on Swatch | No. Dry Cleanings | Percent Deposit After Dry Cleaning | No. Larvae | Observations After Three Weeks | |
|---|---|---|---|---|---|---|
| | | | | | Dead | Feeding |
| DTMO, 1% in Acetone: | | | | | | |
| 1 | 2.8 | 2 | 2.1 | 20 | 20 | Trace. |
| 2 | 2.5 | 2 | 1.8 | 20 | 20 | Do. |
| 3 | 2.2 | 1 | 2.2 | 20 | 20 | None. |
| 4 | 2.4 | 1 | 2.3 | 20 | 19 | Trace. |
| 5 | 2.8 | 0 | | 20 | 20 | None. |
| DDT, 1% in Acetone: | | | | | | |
| 6 | 2.7 | 2 | 1.7 | 20 | 7 | Trace. |
| 7 | 2.5 | 2 | 1.9 | 20 | 13 | Do. |
| 8 | 2.5 | 1 | 1.6 | 20 | 5 | Do. |
| 9 | 3.0 | 1 | 1.8 | 20 | 14 | Do. |
| 10 | 2.3 | 0 | | 20 | 20 | None. |

It is evident from the results shown in Table VII that not only is our compound more destructive to the carpet beetle larvae than is DDT, but that it is more resistant than DDT to dry cleaning, being an effective toxicant even after at least two cleanings.

The prolonged insecticidal effectiveness of our compound is indicated by the results recorded in Table VIII. In the reported tests, bean plants were dusted with 3% dusts of our compound and of "Chlordane" respectively, then infested with 6th instar southern armyworms at the time intervals indicated.

TABLE VIII
*Residual insecticidal activity of DTMO vs. Chlordane*

| | Age of Deposit | Percent Kill |
|---|---|---|
| DTMO, 3% Dust | 1 hr | 100 |
| | 8 days | 100 |
| | 10 days | 100 |
| | 13 days | 100 |
| "Chlordane," 3% Dust | 1 hr | 100 |
| | 8 days | 50 |
| | 10 days | 13.3 |
| | 13 days | 0 |

Fungicidal properties of our compound against early blight of potatoes (*Alternaria solani*) are shown by the results set forth in Table IX of field tests in which our compound, mixed with a test insecticide, was applied to potatoes in nine spray applications in the standard manner at about two week intervals in comparison with the results obtained with the test insecticide alone.

TABLE IX
*Toxicity of DTMO toward fungi*

| | Percent Early Blight After Treatment | Total Yield, Bu. Per Acre |
|---|---|---|
| DTMO [1] + Test Insecticide [2] | 16.25 | 406 |
| Test Insecticide Alone [3] | 31.0 | 358 |

[1] 25% DTMO+75% clay—5 lb./100 gals. of water.
[2] Test insecticide—(25% dichlorodiphenyltrichloroethane+3% para nitro phenyl diethyl thiono phosphate in a petroleum emulsion) at the rate of 1 lb. of emulsion per 800 gals. of water.
[3] 1 lb./400 gals.

Field tests carried out on a Montana range on which grasshoppers averaged 12-15 per square yard showed the results listed in Table X when the toxicants listed were applied to the range with a power turbine blower at the indicated rate per acre.

TABLE X
*Toxicity of DTMO to grasshoppers vs. Chlordane*

| Insecticide | Pounds Applied Per Acre | Percent Kill | |
|---|---|---|---|
| | | 24 hrs. | 72 hrs. |
| DTMO | 1 | 60 | 100 |
| "Chlordane" | 1 | | 75 |

Our compound, mixed with the same test insecticide described in Table IX, was applied to potatoes in New Hampshire fields in comparison with the same test insecticide used alone. The potatoes were given four spray treatments at about two week intervals with each composition. Seven days after the fourth treatment, the insects were dislodged from the plants by the customary "sweep" technique, caught and counted. Table XI shows the relative number of the various insects remaining after the treatments and also shows the improvement in yield of potatoes after treatment with our compound over that when the test insecticide alone was used.

TABLE XI
*Toxicity of DTMO to several potato infesting insects*

| Insecticide | No. of Organisms Caught by Sweeping After Fourth Treatment | | | Bu. per Acre |
|---|---|---|---|---|
| | Flea Beetle | Plant Bugs | Leaf Hoppers | |
| DTMO Comp.[1] + Test Insecticide [2] | 5 | 3 | 2 | 304 |
| Test Insecticide [3] | 61 | 15 | 3 | 220 |

[1] 25% DTMO+75% clay—6 lbs./800 gals. of water.
[2] 25% DDT and 3% p-nitrophenyl diethyl thiono phosphate in a petroleum emulsion—1 lb. of emulsion per 800 gals. of water.
[3] As 1 lb./400 gals. of water.

While the above describes the preferred embodiments of our invention, it will be understood that departures may be made therefrom within the scope of the specification and claims.

We claim:
1. A pesticidal composition comprising as its essential active ingredient a decachlorotetrahydro-4,7-methanoindeneone and a pesticidal adjuvant therefor.
2. A pesticidal composition as defined in claim 1 wherein said active ingredient is dissolved in a a pesticidal adjuvant comprising a liquid organic solvent for the active ingredient.

3. A pesticidal composition as defined in claim 1 wherein said active ingredient is dissolved in a pesticidal adjuvant comprising a hydrocarbon liquid solvent for the active ingredient.

4. A pesticidal composition comprising as its essential active ingredient a decachlorotetrahydro-4,7-methanoindeneone admixed with a water-insoluble solid diluent as pesticidal adjuvant therefor, both in finely divided form.

5. A pesticidal dusting powder comprising a minor proportion of a finely divided decachlorotetrahydro-4,7-methanoindeneone as its essential active ingredient admixed with a major proportion of finely divided clay as pesticidal adjuvant therefor.

6. A method for combating noxious pest organisms which comprises contacting said organisms with a composition containing as an essential active ingredient a decachlorotetrahydro-4,7-methanoindeneone.

7. A method for combating insects of the hymenoptera species which comprises contacting said insects with a composition containing as an essential active ingredient a decachlorotetrahydro-4,7-methanoindeneone.

8. A method for combating insects of the lepidoptera species which comprises contacting said insects with a composition containing as an essential active ingredient a decachlorotetrahydro-4,7-methanonideneone.

9. A method for combating insects of the coleoptera species which comprises contacting said insects with a composition containing as an essential active ingredient a decachlorotetrahydro-4,7-methanoindeneone.

10. A method for combating insects of the orthoptera species which comprises contacting said insects with a composition containing as an essential active ingredient a decachlorotetrahydro-4,7-methanoindeneone.

11. A method for combating fungi which comprises contacting said fungi with a composition containing as an essential active ingredient a decachlorotetrahydro-4,7-methanoindeneone.

EVERETT E. GILBERT.
SILVIO L. GIOLITO.

REFERENCES CITED

The following references are of record in the file of this patent:

UNITED STATES PATENTS

| Number | Name | Date |
|---|---|---|
| 2,507,207 | Hyman | May 9, 1950 |
| 2,519,190 | Hyman | Aug. 15, 1950 |

OTHER REFERENCES

Newcomer et al.: J. Am. Chem. Soc., volume 71, pages 946, 951, March 1949).